United States Patent [19]

Bank

[11] 3,718,771

[45] Feb. 27, 1973

[54] AUTOMATIC TELEPHONE CALLING APPARATUS UTILIZING DIGITAL LOGIC DEVICES

[75] Inventor: Gilbert Bank, Highland Park, N.J.

[73] Assignee: National Midco Industries, Levittown, Pa.

[22] Filed: July 7, 1970

[21] Appl. No.: 52,934

[52] U.S. Cl. .................................179/90 R, 179/90 B

[51] Int. Cl. ...............................................H04m 1/44

[58] Field of Search...170/90 BD, 90 B, 90 R, 90 CS, 170/90 AD, 18 BA; 340/359, 365; 307/226, 220

[56] References Cited

UNITED STATES PATENTS

| | | | |
|---|---|---|---|
| 3,341,666 | 9/1967 | Wallace | 179/90 BD |
| 3,441,685 | 4/1969 | Wallace | 179/90 B |
| 3,422,229 | 1/1969 | Wallace | 179/90 B |
| 3,555,201 | 1/1971 | Kuehnle | 179/90 B |
| 3,515,815 | 6/1970 | Baynard | 179/90 B |
| 3,553,387 | 1/1971 | Wells | 179/90 CS |
| 3,588,362 | 6/1971 | Kass | 179/90 BD |

FOREIGN PATENTS OR APPLICATIONS

| | | | |
|---|---|---|---|
| 1,148,135 | 7/1966 | Great Britain | 179/90 B |
| 248,323 | 3/1960 | Australia | 179/90 B |
| 1,110,606 | 6/1964 | Great Britain | 179/90 B |
| 1,093,184 | 10/1964 | Great Britain | 179/90 B |
| 1,036,467 | 5/1962 | Great Britain | 179/90 B |

*Primary Examiner*—Ralph D. Blakeslee
*Assistant Examiner*—Thomas D'Amico
*Attorney*—Lerner, David & Littenberg

[57] ABSTRACT

An automatic telephone calling apparatus is disclosed in which a first counter counts dial pulses and a second counter counts the digits of a telephone number. A cross-wiring field permits the detection of coincidence between one of the outputs of each counter and one of the outputs of the other counter. When a coincidence is detected, the dial pulse counter is stopped at the desired number of dial pulses. An interdigital timer is then activated to time out a preselected interdigital interval. Thereafter, the dial pulse counter again begins to count dial pulses and again terminates when the particular count cross wired in the cross-wiring field is reached.

3 Claims, 5 Drawing Figures

PATENTED FEB 27 1973 3,718,771

SHEET 1 OF 3

(DIALER)

INVENTOR
G. BANK (OSCILLATOR)

(COUNTDOWN CIRCUIT)

(INTERDIGITAL TIMER)

(RING COUNTER)

AUTOMATIC TELEPHONE CALLING APPARATUS UTILIZING DIGITAL LOGIC DEVICES

FIELD OF THE INVENTION

This invention relates to automatic telephone calling apparatus and, more particularly, to fully electronic digital transmission apparatus for use with a commercial telephone system.

BACKGROUND OF THE INVENTION

It has been known to utilize special calling apparatus for automatically dialing a telephone number. Such apparatus has usually been electromechanical in nature thus being of considerable size and causing some audible noise while operating. Moreover, the moving parts are subject to wear and ultimate failure. Finally, such apparatus tends to be expensive and require the replacement of parts and considerable maintenance.

It is an object of the present invention to provide a fully electronic telephone calling apparatus having no moving parts and subject to only minimal maintenance.

Modern electronics has advanced rapidly due to the low cost and small size integrated circuitry. Such circuitry, when produced in large quantities, provides relatively inexpensive and extremely reliable electronic circuits. Moreover, apparatus designs which utilize integrated circuitry for their implementation are in a particularly good position to take advantage of all of the advances in the integrated circuit art. It is common, for example, for both the size and reliability of such circuits to improve with time.

It is a more specific object of the present invention to utilize all of the numerous advantages of integrated circuitry in providing automatic telephone calling devices.

SUMMARY OF THE INVENTION

In accordance with the present invention, these and other objects are achieved by providing a fully electronic automatic telephone calling apparatus including a first and second counter. The first counter is used to count dial pulses while the second counter is used to count the digits of a telephone number. Each counter is provided with a decoder at its output terminals. These decoders provide signals on one out of a plurality of output leads in response to the value of the input number. These decoder outputs are cross wired to coincidence gates so as to produce an output for each telephone number digit when the number of dial pulses reaches a preselected value. Following each sequence of dial pulses, the dial pulse counter is halted and an interdigital timer is energized to time the interval between dial digits. Following this interval, the dial pulse counter is cleared, the digit counter is advanced by one, and the dial pulse counter is then reenabled to count the next sequence of dial pulses.

The digit counter is initially to set a count corresponding to the first digit of a telephone number. Following the generation of a last sequence of digital pulses, the decoded digit count is also utilized to provided an end-of-dialing signal.

The automatic calling device of the present invention has all the advantages, in terms of reliability and cost, of integrated circuitry. Moreover, it provides dial pulses of a uniform shape and duration and at the maximum rate permissible in the telephone system. For these reasons, a telephone number may be dialed at the fastest rate permissible by the telephone network.

These and other objects and features, the nature of the present invention and its various advantages, will be more readily understood upon consideration of the attached drawings and of the following detailed description of the drawings.

DETAILED DESCRIPTION OF THE DRAWINGS

Figure 1:
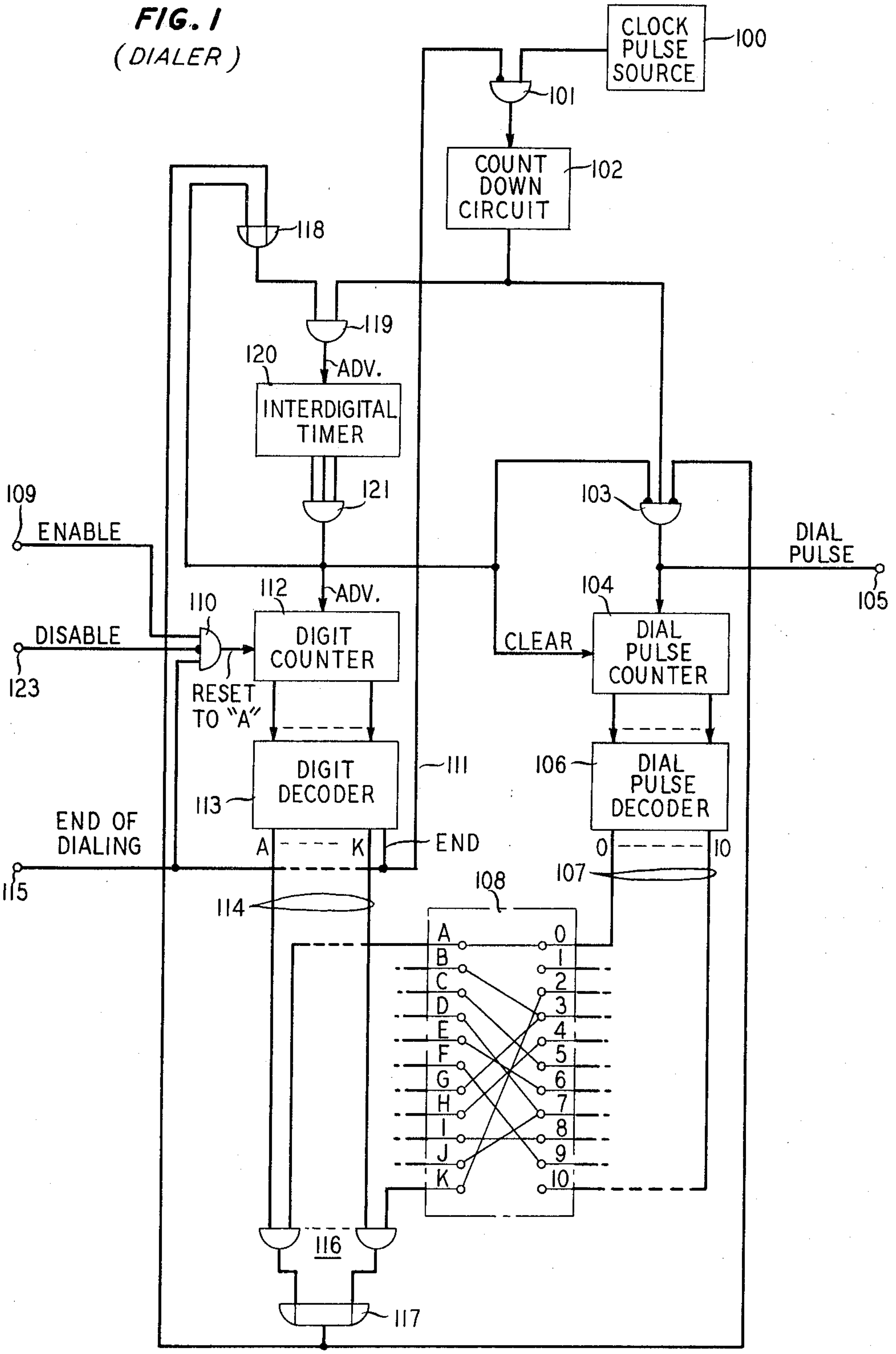
FIG. 1 is a general block diagram of an electronic dial pulse generating circuit suitable as a telephone calling device in accordance with the present invention.

In FIG. 1 there is shown an automatic telephone dialer comprising a pulse source 100, the output of which is applied through inhibiting gate 101 to countdown circuit 102. Pulse source 100 may be any type of pulse oscillator, such as a free-running multivibrator or an RC relaxation oscillator, and countdown circuit 102 may be a plurality of binary counting stages, i.e., flip-flops. In any event, the frequency of source 100 and the countdown ratio of circuit 102 are chosen to provide standard telephone dialing pulses at the output of circuit 102, e.g., 50 per cent duty cycle, 10 Hz square waves, or any other waveform requirements imposed by the telephone system.

The output of countdown circuit 102 is applied through inhibit gate 103 to dial pulse counter 104. The output of gate 103 is also supplied to terminal 105 as dial pulses for transmission on the telephone line.

Dial pulse counter 104 counts up to the value of the first digit of the telephone number to be dialed, and that number of pulses is supplied to terminal 105. The binary output of dial pulse counter 104 is decoded in binary-to-decimal decoder 106 which supplies pulses to each of its ten output leads 107 in sequence in response to the input count.

A cross-wiring field 108 is provided wherein a plurality of digit terminals on the left, labelled A through K, can be cross-connected to any one of a plurality of digit value terminals on the right, labelled 0 through 9. The automatic dialer of FIG. 1 is programmed to dial a particular telephone number by connecting the letter-designated digit terminals to the number-designated value terminals in the same sequence as the telephone number to be dialed. As an example, FIG. 1 is cross wired to dial the telephone number 357–693–4872. Digit positions which are not used, such as the A digit position of FIG. 1, are connected to the 0 terminal and no dial pulses are produced for that digit position. Any other telephone number could, of course, be wired into field 108 in a similar manner.

The operation of the automatic dialer of FIG. 1 is initiated by a signal at terminal 109 which is applied to gate 110. Another input to gate 110, indicating that a dialing sequence is not already in progress, is taken from the lead 111. An inhibit input is also supplied to gate 110 from terminal 123. The output of gate 110 sets the digit counter 112 to an initial value A. Counter 112 is arranged to count the successive digits of a telephone number up to a maximum number of, for example, 11. The binary output of counter 112 is decoded in the binary-to-one-out-of-twelve decoder 113. As previously noted, the successive digits are labelled A through K on output leads 114. The twelfth lead 111 indicates the end of dialing and is connected to terminal 115, gate 110 (as previously noted), and to inhibit gate 101 to terminate the application of clock pulses from source 100 to the dialer circuit.

When the number of dial pulses reaches the terminal in field 108 cross-connected to the current telephone number digit, one of the bank 116 of coincidence gates is fully enabled, providing an input to OR gate 117. The output of OR gate 117 is used to disable gate 103, preventing the application of further dial pulses to terminal 105 and counter 104, thus holding the count at the preselected cross-wired value. The output of gate 117 is also applied through OR gate 118 and coincidence gate 119 to a counter circuit 120.

Counter 120 is used to time the interval between successive digits of the dialed telephone number. To this end, 10 Hz pulses from countdown circuit 102 are applied through coincidence gate 119 to counter 120 which counts successive 10 Hz input pulses. At a selected count value, 10 for example, coincidence gate 121 is fully enabled and produces an output to advance digit counter 112.

The output of gate 121 also resets dial pulse counter 104 in preparation for the next digit to be dialed. When digit counter 112 is advanced, the output is removed from the previously energized lead from decoder 113, thus disabling the appropriate one of coincidence gates 116 and removing the output from gate 117. In order to allow counter 120 to advance one more count beyond that count which produces an output from gate 121, the output of gate 121 is also supplied through OR gate 118 to continue the enablement of gate 119. Once counter 120 has advanced to the next count, the output disappears from gate 121 and counter 120 remains in this initialized condition. During this initialization, the disablement of gate 103 is continued by the output of gate 121.

Thereafter, the generation of the next dialed digit takes place as before, terminating when the cross-connection in field 108 produces an output from OR gate 117. The interdigital interval is then times out by counter 120, digit counter 112 is advanced to the next digit, and the process is repeated.

The dialing sequence terminates when counter 112 has counted through all of the telephone number digit positions (eleven in FIG. 1). The final advancement of counter 112 produces an output on lead 111, signaling the end of dialing at terminal 115 and disabling the clock output at gate 101.

The circuit of FIG. 1 is particularly useful in the automatic digital telephone terminal which forms the subject matter of the copending application of Bank-Schuss-Vinocur filed of even date herewith and assigned to applicants' assignee.

Figure 2:
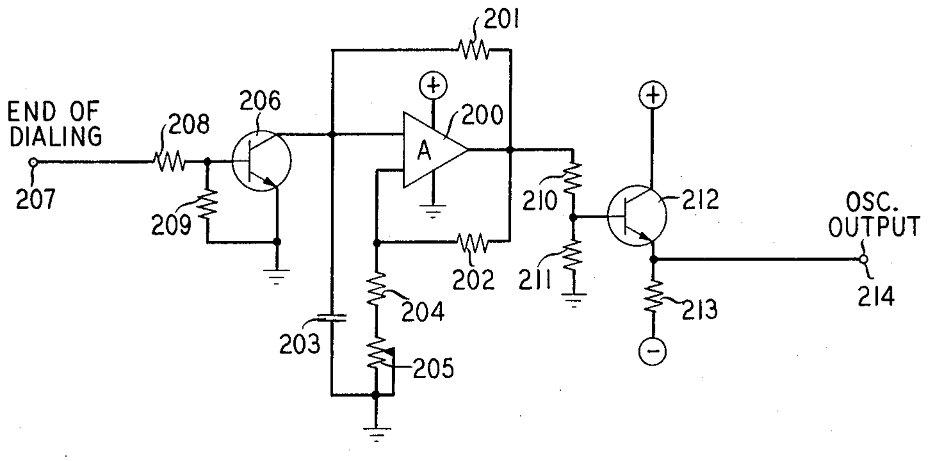
FIG. 2 is a detailed circuit diagram of an oscillator suitable in a pulse source circuit of FIG. 1.

In FIG. 2 there is shown a detailed circuit diagram of an oscillator circuit suitable for use as pulse source 100 in FIG. 1. The oscillator circuit of FIG. 2 comprises an operational amplifier 200 connected as a relaxation oscillator by means of feedback resistors 201 and 202 connecting the output of amplifier 200 to its respective input terminals. The upper input terminal of amplifier 200 is connected by way of capacitor 203 to ground potential. The lower input terminal of amplifier 200 is connected by way of resistor 204 and variable resistor 205 to ground potential. When so connected, amplifier 200 provides a relaxation oscillator operating at a frequency determined by the values of the circuit components. For use in the present invention, the repetition rate of this relaxation oscillator is set at some integral multiple of the standard dial pulse rate of 10 Hz. For example, the oscillator of FIG. 2 may be adjusted to oscillate at 60 Hz.

A transistor 206 is provided as a clamping gate across the input of amplifier 200. Transistor 206 is operated by a signal at input terminal 207 across a resistive voltage divider comprising resistors 208 and 209. When energized by a positive signal at terminal 207, transistor 206 clamps the upper input terminal of amplifier 200 to ground potential, shunting out capacitor 203 and effectively disabling the oscillator. With no input signal at terminal 207, the oscillator remains free to operate and generates signals at a 60 Hz rate.

The output of amplifier 200 is applied across a voltage divider comprising resistors 210 and 211. The midpoint of these resistors is applied to the base of transistor 212. Transistor 212 is thus turned on in the presence of a positive output signal from amplifier 200. Indeed, transistor 212 is turned on and off in response to the output of the relaxation oscillator including amplifier 200. This signal appears across output resistor 213 and appears at oscillator output terminal 214.

Figure 3:
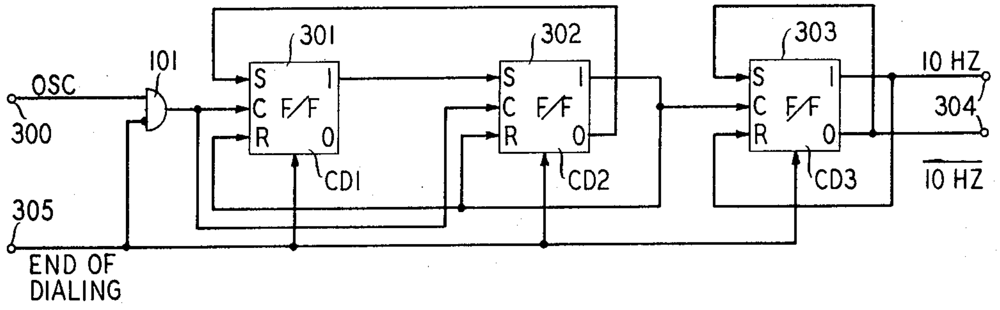
FIG. 3 is a detailed block diagram of a countdown circuit suitable for use in the dialing circuit of FIG. 1.

In FIG. 3 there is shown a detailed block diagram of a countdown circuit suitable for use as countdown circuit 102 in FIG. 1. The output of the oscillator circuit of FIG. 2 is applied at input terminal 300 of the countdown circuit of FIG. 3. As illustrated in FIG. 1, this oscillator output is applied to inhibit gate 101 and thence to the first stage 301 of a three stage binary counting circuit including input stage 301, intermediate stage 302, and output stage 303. The various stages of the counting circuit of FIG. 3 are interconnected to provide a countdown ratio of six. Thus, the "1" output of intermediate stage 302 is connected to the reset input of stages 301 and 302. The "0" output of stage 302 is applied to the set input of stage 301. The output of inhibit gate 101 is connected to the clock input of stages 301 and 302. The "1" output of stage 302 is also applied to the clock input of stage 303. The "1" and "0" outputs of stage 303 are connected to the reset and set inputs, respectively, of stage 303.

When interconnected as described above, the three stage counter shown in FIG. 3 counts a total of six input pulses from gate 101 and then recycles to its original stage. Thus, if pulses are supplied to terminal 300 at a 60 Hz rate, the output pulses appear at terminals 304 at a 10 Hz rate. This is precisely the dial pulse rate required for the commercial telephone system.

At the end of a dialing sequence, as described in connection with FIG. 1, an end of dialing pulse is provided at terminal 305. This end of dialing pulse is used to inhibit gate 101 and at the same time clear all three stages 301, 302 and 303 of the countdown counter. Thus, the countdown circuit is always initialized to an all zero state prior to the beginning of each dialing sequence.

Figure 4:
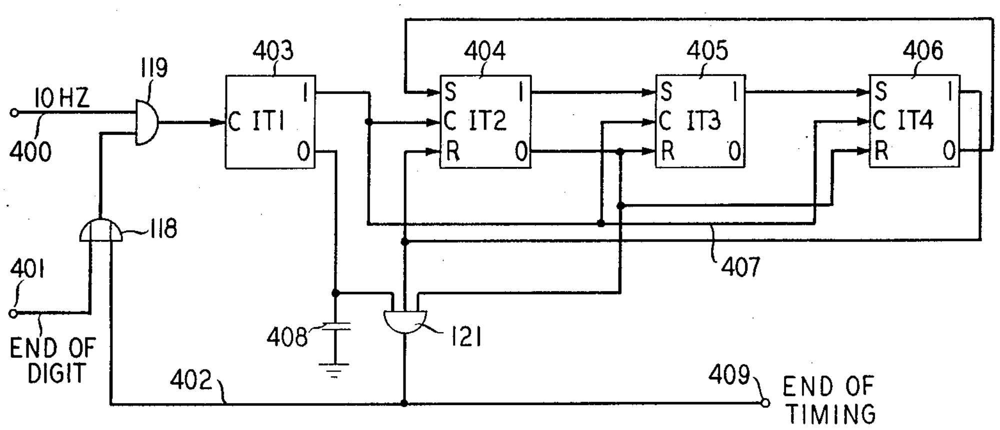
FIG. 4 is a block diagram of an interdigital timing circuit suitable for use in the dialer circuit of FIG. 1.

In FIG. 4 there is shown an interdigital timer circuit which may be used as timer 120 in FIG. 1. The timing circuit of FIG. 4 is driven by 10 Hz clock pulses provided at input terminal 400 and supplied to AND gate 119. The other input to AND gate 119 is taken, as discussed in connection with FIG. 1, from OR gate 118. The input to OR gate 118 comprises an end of dialing pulse from terminal 401 and an end of timeout pulse from output bus 402.

The output of AND gate 119 is applied to the trigger input of binary input stage 403 of a four state binary counter. The counter of FIG. 4 also includes stages 404, 405 and 406. The "1" output of stage 403 is applied by way of bus 407, to the trigger input of all of stages 404, 405 and 406. The "1" output of stage 404 is applied to the set input of stage 405 while the "1" output of stage 405 is applied to the set input of stage 406. The "0" output of stage 404 is applied to the reset inputs of stages 405 and 406. The "1" output of stage 406 is applied to the reset input of stage 404 while the "0" output of stage 406 is connected to the set input of stage 404.

When connected as described above, the four stage counter of FIG. 4 operates as a decade counter, counting input pulses at input terminal 400 up to 10 and then recycling to zero. The "0" outputs of stages 403 and 404, together with the "1" output of stage 406, are applied to AND gate 121. The "0" output from stage 403 is connected to capacitor 408 to insure that the duration of this pulse is adequate to permit the complete enablement of gate 121.

When fully enabled gate 121 provides an output pulse at terminal 409, indicating that ten input pulses have been received at input terminal 400. The output of gate 121 is also supplied, by way of bus 402 and OR gate 118, to continue the enablement of AND gate 119. As described in connection with FIG. 1, this allows one more dial pulse from terminal 400 to be applied to the decade counter to recycle that counter to all "0" condition.

The timing circuit illustrated in FIG. 4 is only one way for providing the interdigital timing interval. This timing interval may also be supplied by a simple resistor-capacitor timing circuit or by a monostable multi-vibrator circuit. The counter of FIG. 4 has the advantage of providing accurate timing intervals, directly dependent upon the repetition of the dial pulses. Moreover, the counter of FIG. 4 permits a relatively long timing period, such as one second, without the necessity for large and cumbersome circuit elements. The circuit of FIG. 4 is eminently suitable for implementation in the form of integrated circuitry.

Figure 5:
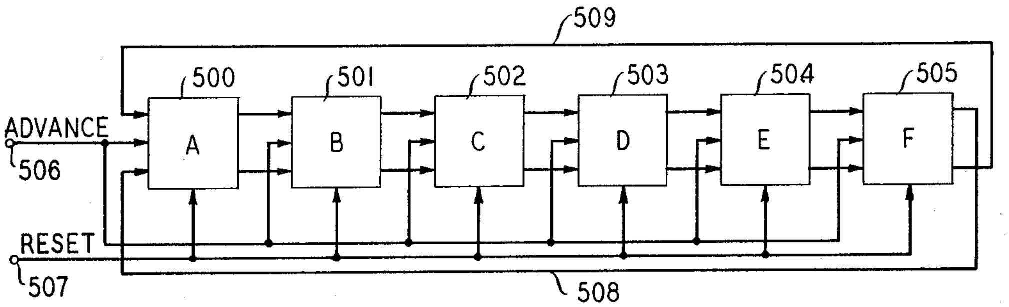
FIG. 5 is a detailed block diagram of a ring counter circuit suitable for use as a digit counter and a dial pulse counter for use in the dialing circuit of FIG. 1.

In FIG. 5 there is shown detailed block diagram of a ring counter circuit suitable as dial pulse counter 104 and digit counter 112 in the dialing circuit of FIG. 1. The ring counter of FIG. 5 comprises six binary stages 500 through 505, labelled A through F. The output of each stage of the ring counter of FIG. 5 is applied, shift register style, directly to the corresponding inputs of the next succeeding stage. The "1" output of the final stage 505 is applied, by way of lead 508, to the reset input of the input stage 500. Similarly, the "0" output of the last stage 505 is applied, by way of lead 509, to the set input of input stage 500. Advance pulses appearing at input terminal 506 are applied to the trigger input of all of stages 500 through 505. A reset pulse appearing at input terminal 507, is applied to all of stages 500 through 505 to clear these stages.

In operation, the ring counter of FIG. 5 is initially reset to its all O's condition by a reset pulse at input terminal 507. The next following advance pulse at input terminal 506 causes input stage 500 to be set to its "1" state due to the signal appearing on feedback lead 509. The next five succeeding clock pulses appearing at input terminal 506 serve to advance this "1" state through the successive stages of the ring counter. Each of these five advance pulses also serve to set a "1" into the first stage 500 of the counter.

The 1's are propagated through the stages of the ring counter of FIG. 5 until a "1" appears at the last stage 505. The next succeeding advance pulse (the seventh) at terminal 500 resets input stage 500 due to the feedback signal on lead 508. This "0" state of the input stage is also propagated through the successive stages of the ring counter upon the application of successive advance pulses. Each advance pulse also enters a zero state into input stage 500 due to the continuation of the signal on the feedback lead 508. When the "0" stages have propagated through the entire ring counter to the output stage 505, the ring counter of FIG. 5 has returned to its initial state.

It can be seen from the above description that the ring counter of FIG. 5 counts up to a maximum of 12. That is, the first six advance pulses applied to terminal 506 serve to fill the ring with all 1's. The next six advance pulses serve to fill the ring with all 0's. This sequence can be better seen by referring to Table I in which the first column indicates the successive advance pulses while the remaining columns indicate the states of all of the stages of the ring counter.

TABLE I

| | STAGES | | | | | |
|---|---|---|---|---|---|---|
| Advance Pulse | A | B | C | D | E | F |
| 0 | 0 | 0 | 0 | 0 | 0 | 0 |
| 1 | 1 | 0 | 0 | 0 | 0 | 0 |
| 2 | 1 | 1 | 1 | 0 | 0 | 0 |
| 3 | 1 | 1 | 1 | 0 | 0 | 0 |
| 4 | 1 | 1 | 1 | 1 | 0 | 0 |
| 5 | 1 | 1 | 1 | 1 | 1 | 0 |
| 6 | 1 | 1 | 1 | 1 | 1 | 1 |
| 7 | 0 | 1 | 1 | 1 | 1 | 1 |
| 8 | 0 | 0 | 1 | 1 | 1 | 1 |
| 9 | 0 | 0 | 0 | 1 | 1 | 1 |
| 10 | 0 | 0 | 0 | 0 | 1 | 1 |
| 11 | 0 | 0 | 0 | 0 | 0 | 1 |
| 12 | 0 | 0 | 0 | 0 | 0 | 0 |

It can be seen from Table 1 that each state of the overall ring counter can be detected by recognizing the state of only two stages of that counter. For example, the zero state of the counter is uniquely determined by the "0's" appearing in the A and F stages. The one state of the counter is uniquely determined by the "1" appearing in the A stage and the "0" appearing in the B stage of the counter. These pairs of states for the stages are summarized in Table II and are indicated as an AND function.

TABLE II

| Advance Pulses | State of Detection |
|---|---|
| 0 | $\bar{A} \cdot \bar{F}$ |
| 1 | $A \cdot \bar{B}$ |
| 2 | $B \cdot \bar{C}$ |
| 3 | $C \cdot \bar{D}$ |
| 4 | $D \cdot \bar{E}$ |
| 5 | $E \cdot \bar{F}$ |
| 6 | $A \cdot F$ |
| 7 | $\bar{A} \cdot B$ |
| 8 | $\bar{B} \cdot C$ |
| 9 | $\bar{C} \cdot D$ |
| 10 | $\bar{D} \cdot E$ |
| 11 | $\bar{E} \cdot F$ |
| 0 | $\bar{A} \cdot F$ |

It can be seen from Table II that the output of the ring counter of FIG. 5 can be decoded by simple two-input AND gates connected to the stages of the ring counter as illustrated by the logical AND functions listed in Table II. The output of these gates correspond to the the outputs of the decoders 106 and 113 in FIG. 1.

The 11 distinguishable states of the ring counter of FIG. 5 are used in dial pulse decoder 106 (FIG. 1) to count from zero up to 10 dial pulses on 10 output leads 107. The 11 states of the ring counter of FIG. 5 are also used by digit decoder 113 in FIG. 1 to provide three digits as an area code, three digits as an office code, and four digits as a line code. The last state of the counter 113 (FIG. 1) is used in digit decoder 113 to provide the end of dialing signal appearing on output lead 111.

The various integrated circuits used to implement FIGS. 2 through 5 described above can be made up of integrated circuit packages secured from the Raytheon Company and described in a catalog entitled "930 Series DTL", Serial Number ST-300, and dated May, 1969. Other comparable integrated circuit packages can be obtained from other manufacturers having the same or vary similar properties and interconnected as suggested by the integrated circuit package manufacturers.

The dialer shown in FIG. 1 is arranged to dial only a single telephone number. It is apparent, however, that digit counter 112 could be arranged to count to a higher number, such as, for example, the number 24. The cycle then followed by the circuit would be to dial a first number, produced an end of dialing signal, and, if reenabled, to continue generating dial pulses, but this time from the balance of the cross-wiring field in which a different telephone number is cross-wired. It is also possible, for example, to provide transfer switches to transfer the dial pulse lead 107 to a completely different set of digit terminals wherein a different number is crossed-wired. It is therefore to be understood that the above-described arrangements are merely illustrative of the numerous and varied other arrangements which may comprise applications of the principles of the invention. Such other arrangements will be readily apparent to those skilled in the art without departing from the spirit or scope of the present invention.

What is claimed is:

1. An automatic telephone calling circuit comprising:

a dial pulse counter for normally counting dial pulses responsive to an interdigit signal for not counting said dial pulses;

a digit counter for counting occurences of said interdigit signal;

an interdigit counter responsive to said interdigit signal for counting said dial pulses;

a coincidence detector for detecting the coincidence of preselected counts from said dial pulse counter and said digit counter to provide said interdigit signal; and means responsive to said interdigit counter reaching a predetermined count for terminating said interdigit signal.

2. The automatic telephone calling circuit as defined in claim 1 in which said dial pulse counter and said digit counter each include:

a ring counter having an input and an output, said ring counter including a plurality of stages each of said stages having an input and an output;

means for connecting the output of said ring counter inversely to said input of said ring counter;

means for advancing said ring counter;

a plurality of two input AND gates; and means for connecting said output of selected pairs of said stages to each of said AND gates.

3. The automatic telephone calling circuit as defined in claim 1 further including a binary decoding circuit comprising a plurality of two-input And gates, and means for connecting said outputs of selected pairs of said stages to each of said And gates.

* * * * *